United States Patent [19]

Bietlot

[11] 3,914,945

[45] Oct. 28, 1975

[54] PROCESS FOR DISPOSING OF THE EFFLUENTS FROM THE DISTILLERS OF AMMONIA-SODA PLANTS

[75] Inventor: Albert Bietlot, Brussels, Belgium

[73] Assignee: Solvay & Cie., Brussels, Belgium

[22] Filed: May 29, 1974

[21] Appl. No.: 474,446

[30] Foreign Application Priority Data
June 6, 1973  France .............................. 73.20665

[52] U.S. Cl. ............. 61/.5; 23/272 AH; 166/305 D; 299/4
[51] Int. Cl.$^2$ ...................... B65G 5/00; E21F 17/16
[58] Field of Search ............... 23/272 AH; 61/.5, 35; 166/305 D; 210/46, 170; 299/4, 5

[56] References Cited
UNITED STATES PATENTS

| | | | |
|---|---|---|---|
| 3,151,462 | 10/1964 | Raetzsch.................................. | 61/.5 |
| 3,172,845 | 3/1965 | Manning................................ | 210/46 |
| 3,491,540 | 1/1970 | Lennemann ............................ | 61/.5 |
| 3,724,898 | 4/1973 | Jacoby..................................... | 61/.5 |

*Primary Examiner*—Samih N. Zaharna
*Assistant Examiner*—Peter A. Hruskoci
*Attorney, Agent, or Firm*—Spencer & Kaye

[57] ABSTRACT

Process for disposing of the effluents from the distillers of ammonia-soda plants at the bottom of subterranean cavities of disused salt boreholes, the cavities being filled with a sodium chloride brine to prevent subsidence and an equivalent volume of the brine being recovered. The effluent introduced at the bottom of the borehole comprises a calcium chloride solution which has been concentrated to a density significantly higher than that of the saturated solution of sodium chloride present in the borehole.

8 Claims, No Drawings

PROCESS FOR DISPOSING OF THE EFFLUENTS FROM THE DISTILLERS OF AMMONIA-SODA PLANTS

BACKGROUND OF THE INVENTION

The present invention relates to a process for disposing of the effluents from the distillers of ammonia-soda plants at the bottom of subterranean cavities of disused salt boreholes.

It is well known that, in ammonia-soda plants, the ammonium chloride liquors separated from the crude sodium bicarbonate precipitated in the carbonating towers are heated with steam in the presence of milk of lime, in order to regenerate and recover the ammonia. This operation, named "distillation," is carried out in columns called "distillers." An equivalent amount of calcium chloride is formed at the same time and remains in solution together with the sodium chloride that has passed unchanged through carbonating. Mixed with and suspended in this solution of calcium chloride and sodium chloride are various insoluble salts, among others calcium aluminate, silicate, carbonate and sulfate as well as silica, iron oxides and other insoluble materials introduced via the lime (TE-PANG HOU - Manufacture of SODA - 2nd edition - 1942 - p. 237).

The soda plants located in the vicinity of the sea or other large volumes of naturally-occurring water can dispose of waste liquors and solids in these water masses. On the other hand, inland soda plants are faced with the problem of waste disposal. It is possible, in some degree, to separate the solids in suspension by decantation and to set them aside in dams or embankments, the clear liquor being optionally concentrated by multipleeffect evaporation in order to recover in sequence solid refined sodium chloride and liquid or crystallized calcium chloride (TE-PANG HOU - Manufacture of SODA - 2nd edition - 1942 - p. 252).

However, the need for calcium chloride in the marketplace may be below the amount obtained as by-product in the manufacture of sodium carbonate and the manufacturers are then bound to find others ways of disposal.

In the U.S. Pat. No. 3,172,845, filed on August 14, 1961, on behalf of George Hall Manning and assigned to Imperial Chemical Industries Ltd, a process is described wherein the solids in suspension in the distiller effluents are separated out and treated in order to be sent to the bottom of subterranean cavities of disused salt boreholes. The clear liquors obtained according to that process are cooled, desupersaturated in respect of sulfate and carbonated to neutralize any calcium hydroxide, after which they can usually be disposed of into rivers and other drainage systems. It is advisable, according to the above patent, to remove as much calcium chloride as possible from the slurries sent into the boreholes in order to avoid the contamination of the sodium chloride brines which are automatically withdrawn from the boreholes, the contamination being known as harmful to a further use of the brines in a soda plant or in any other production. Indeed, it is known that disused boreholes are filled with sodium chloride brine in order to prevent any risk of subsidence and that the determined volume of waste pumped to the bottom of borehole cavities immediately induces at the outlet an equivalent volume of brine.

SUMMARY OF THE INVENTION

In recent times, the protection of the environment has become of greater importance, and accordingly it has been resolved to reduce as much as possible the amount of chlorides disposed of into the rivers.

It has now been found, in accordance with the present invention, that the pumping of calcium chloride solutions to the bottom of boreholes does not promote significant diffusion of calcium chloride in the supernatant brine of sodium chloride that is withdrawn, provided that the pumped solution has been beforehand concentrated so as to bring it to a density significantly higher than that of the saturated sodium chloride solution (1.195 – 1.200 g/cc). It has been noted indeed that the molecular calcium diffusion resulting from the concentration gradient of the diffusing substance is not very significant, provided there is a great difference between the densities of the two liquid solutions. Further, the turbulent diffusion due to local movements in the liquid, while being distinctly higher than the molecular diffusion, also remains within very allowable limits, if the difference between the densities of the two liquid solutions is sufficient.

DETAILED DESCRIPTION OF THE INVENTION

The present invention relates thus to an improvement in the process for disposing of the effluents from the distillers of ammonia-soda plants at the bottom of subterranean cavities of disused salt boreholes, the cavities being filled with sodium chloride brine to prevent subsidence, and a volume of sodium chloride brine equivalent to the volume of effluents introduced being recovered for use in a soda plant or in any other manufacture. In the practice of the present invention, the effluents disposed of in the boreholes are calcium chloride solutions obtained from the distillers and which effluents have been concentrated to a density significantly higher than that of the saturated sodium chloride solution. In one embodiment of the invention, the effluents thus disposed of are the whole of the liquid and solid effluents from the distillers, which effluents have been previously concentrated so as to bring them to a density significantly higher than that of the saturated solution of sodium chloride present in the borehole. In another embodiment of the present invention, the effluents disposed of are the concentrated liquid effluents alone after separation of the solids in suspension and optionally after separation of the dissolved sodium chloride.

A particularly preferred embodiment of the present invention comprises pumping to the bottom of disused boreholes an approximately 40% solution of calcium chloride ($d =$ 1.390 g/cc) obtained by settling from the solids in suspension in the distiller effluents and concentration of the clear liquor with precipitation of sodium chloride by evaporation in a multiple-effect evaporator.

It is also possible to separate the solids from the effluents and to concentrate the clear liquor constituted by a mixed solution of calcium chloride and sodium chloride up to a level of density sufficiently apart from the density of the saturated sodium chloride solution.

As a matter of fact, it may be deemed that the density of the liquid introduced must be at least approximately 1.300 g/cc, when the density of the saturated brine is equal to 1.200 g/cc.

In order to reduce to a minimum the contamination risks of the recovered NaCl brine, it is important to keep, as much as possible, the introduction point of the concentrated solution of $CaCl_2$ away from the take-off point of the NaCl brine withdrawn by way of compensation. For this purpose, the introduction pipe for the concentrated solution of $CaCl_2$ must reach the bottom of the cavity, while the discharged brine is recovered as near as possible to the highest point of the roof of the cavity. The density of the liquid introduced into the borehole may be as high as determined by the limit of solubility of calcium chloride in water under the conditions prevailing in the process. As said hereabove, a density of 1.390 g/cc corresponds to a 40 % solution of calcium chloride, i.e. 40 g $CaCl_2$ for 100 g solution. Theoretically, at 70°C, the concentration of $CaCl_2$ in the solution injected into the cavity might be as high as about 58 %, i.e. 58 g $CaCl_2$/100 g solution, but this value would be of course uneconomical — owing to the cost necessary for the evaporation - and in most cases a concentration comprised between 31.2 g $CaCl_2$/100 g solution (d = 1.300 g/cc) and 40 g $CaCl_2$/100 g solution ($d = 1.390$ g/cc) is sufficient to prevent a significant diffusion of calcium chloride in the sodium chloride brine present in the cavity. Furthermore, it must be kept in mind that the use of a solution having a concentration higher than 40 % is liable to cause the clumping of the injection pipes in case of an accidental stop of the exploitation.

The Invention is illustrated by the following example:

EXAMPLE

In a soda-ammonia process, the muddy liquid leaving a distiller had a density of about 1.1 and amounted to approximately 9 m³ per ton of soda ash produced. The muddy liquid contained dissolved salts: mainly $CaCl_2$, NaCl, $Ca(OH)_2$, and $CaSO_4$; and solids in suspension: (about 30 kg/m³ of muddy liquid).

Before injection into the cavities, as well as for the production of solid calcium chloride, the muddy liquid is successively subjected to a purification to prevent build up in a subsequently used concentration evaporator, and a concentration to obtain a liquid with an appropriate density.

The purification comprises the following successive or simultaneous steps:

1. continuous decantation of the muddy liquid in a 10 m diameter settler giving (per ton of soda ash produced): a) about 5 m³ of clear liquid at approximately 80°C, b) about 4 m³ of settled slurry containing all the solid materials of the muddy liquid;
2. purification of the clear liquid with a) lowering of the $Ca(OH)_2$ content by carbonating, b) lowering of the $CaSO_4$ content.

After purification is complete, about 5 m³ of purified liquid (per ton of soda ash) of a 1.1 density is obtained and this purified liquid is then concentrated. Concentration is carried out in a multiple-effect evaporator to reduce the consumption of required steam, and this operation gives a suspension of sodium chloride crystals in a solution of calcium chloride at approximately 70°C.

The resulting suspension is treated in appropriate separators (filters, centrifuges, or the like) in order to obtain (per ton of soda ash produced): about 0.4 t of crystallized vaporizable sodium chloride; and about 1.2 m³ of $CaCl_2$ solution with a density near to 1.4 g/cc at 70°C.

This $CaCl_2$ solution is injected under pressure or by gravity into a disused isolated cavity or into disused connected cavities.

A steel column set in a cemented casing is used to introduce the $CaCl_2$ solution to the bottom of the cavity.

The brine discharged by the injection of $CaCl_2$ is withdrawn at the roof of the cavity, either through the annular space of the system column-casing, in the case of an isolated cavity, or through a borehole constituting an outlet if the cavities are connected together.

Knowing the useful volume of the cavity, measured previously, for example, by ultrasonics, the stored $CaCl_2$ volume could be in a first approximation equal to 90% of the volume. As for the recovered brine, it is sent to production.

In this way, for 1 m³ of injected and stored $CaCl_2$, there is recovered 1 m³ of saturated brine containing 0.310 t of NaCl and for each ton of soda ash produced 0.310 t × 1.2 = 0.372 ton of NaCl is recovered.

It will be understood that the above description of the present invention is susceptible to various modifications, changes and adaptations, and the same are intended to be comprehended within the meaning and range of equivalents of the appended claims.

I claim:

1. In a process for disposing effluent from the distiller of an ammonia-soda plant at the bottom of a subterranean cavity of a salt borehole, wherein the said cavity is filled with a saturated solution of sodium chloride brine to prevent subsidence, and a volume of sodium chloride brine equivalent to the volume of effluent introduced is recovered the improvement comprising: disposing as effluent a calcium chloride solution which has been concentrated to a density significantly higher than that of the saturated solution of sodium chloride present in the borehole, said significantly higher density being at least about 1.3 g/cc.

2. The process according to claim 1 wherein the effluent from the distiller contains liquid and suspended solids and the whole of the liquid and solid effluent of the distiller has been concentrated to provide the calcium chloride solution.

3. The process according to claim 1 wherein the effluent from the distiller contains suspended solids and the solids suspended in the effluent from the distiller have been separated from the effluent before concentration of the effluent to said significantly higher density.

4. The process according to claim 3 wherein sodium chloride dissolved in the effluent has been separated from the effluent after removal of the solids and before concentration.

5. The process according to claim 1 wherein the effluent introduced at the bottom of the borehole is a solution containing approximately 40% of calcium chloride.

6. The process according to claim 5 wherein the distiller effluent contains suspended solids and the calcium chloride solution is obtained by settling the solids in suspension in the distiller effluent to provide a clear liquor and concentrating the clear liquor by precipitating sodium chloride by evaporation in a multiple-effect evaporator.

7. A process according to claim 1 wherein the cavity contains a roof and the take-off point of the recovered sodium chloride brine is as near as possible to the highest point of the roof of the cavity.

8. The process according to claim 1 wherein the density of the disposed effluent is concentrated to between about 1.3 g/cc and about 1.4 g/cc.

* * * * *